Jan. 19, 1960
C. S. PHELAN
2,921,481
SINGLE LINE COMPENSATOR
Filed April 2, 1958
3 Sheets-Sheet 1
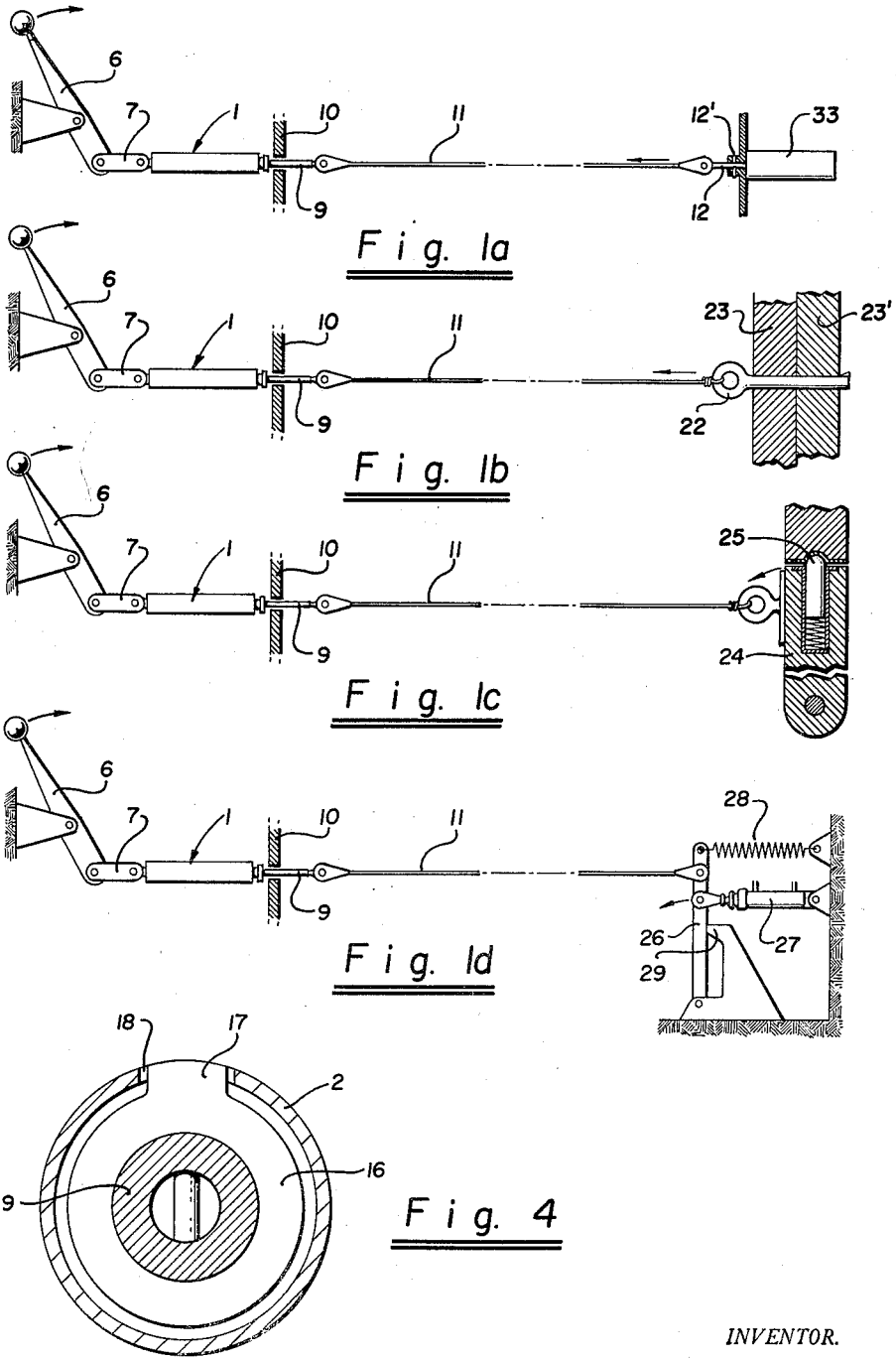
INVENTOR.
Charles S. Phelan
BY
Paul B. Hunter
Attorney Jan. 19, 1960   C. S. PHELAN   2,921,481
SINGLE LINE COMPENSATOR
Filed April 2, 1958   3 Sheets-Sheet 2
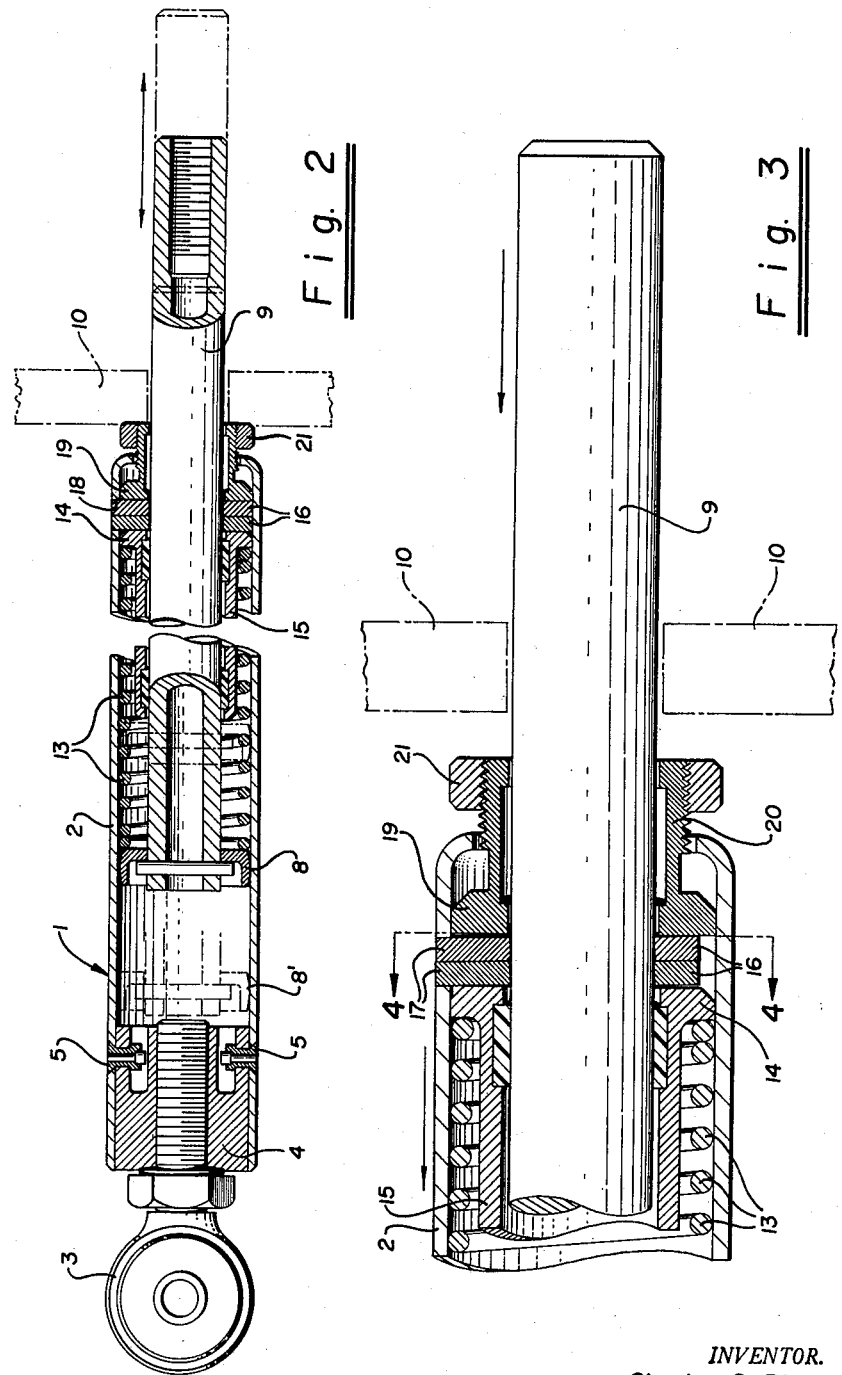
INVENTOR.
Charles S. Phelan
BY Paul B. Hunter
Attorney

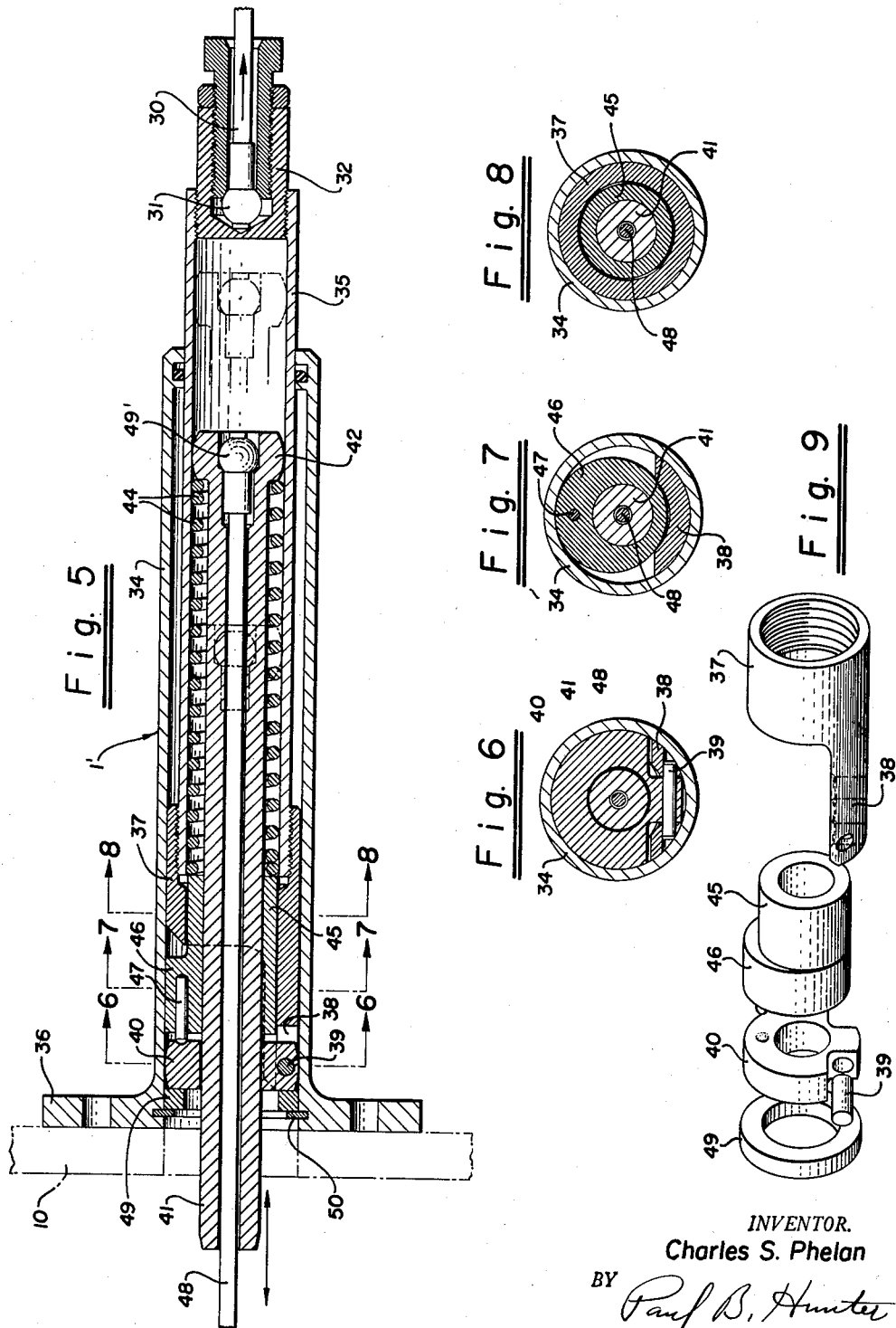

United States Patent Office 2,921,481
Patented Jan. 19, 1960

2,921,481

SINGLE LINE COMPENSATOR

Charles S. Phelan, Tustin, Calif., assignor, by mesne assignments, to Pacific Scientific Company, San Francisco, Calif., a corporation of California Application April 2, 1958, Serial No. 725,993

7 Claims. (Cl. 74—501.5)

This invention relates, generally, to control cable compensators or regulators, and has reference, more particularly, to a novel single line compensator or regulator for maintaining a constant rig load in a cable system regardless of temperature or other factors tending to cause changes in the length of such cable system.

It is most desirable in many types of cable systems to maintain a constant cable tension to prevent formation of slack or over-tautness in the cable system by maintaining automatically a constant rig load when the system is not under an operating or motivating force, and this is especially true in braking systems such as the braking system of an aircraft, dump valve release cable systems, emergency landing gear systems, tab control cable systems, cable systems for remote control of valves or butterfly gates, mechanical bomb or rocket releases, and any remote control operation that may be accomplished by a tension cable.

The principal object of the present invention is to provide a novel single line compensator that is of compact, rugged, and simple construction, and which is extremely reliable in use, the said compensator serving to maintain the operating cable under a desired rig load at all times, whereby slackness or over-tautness of the system is eliminated, so that the system responds immediately to an operating movement without becoming mushy and the control element, such as the brake pedal, is retained in a fixed off position resulting in constant and dependable operation at all times.

A further object of the present invention is to provide a novel single line compensator that employs a canting washer or washers and a compensating spring, the said spring becoming operative immediately upon the releasing of the controlling member to maintain the cable system at a desired rig load or tension at all times when the system is not being actually used to effect an operative movement, the canting washer or washers serving to lock the spring against compensating action as soon as the control member is actuated to effect a controlling movement.

Still another object of the present invention is to provide a novel single line compensator that is so constructed and arranged as to provide immediate and positive response to any operating force and yet to prevent slack or over-tautness in the control cable system by maintaining automatically a constant rig load when the system is not under an operating force.

These and other objects and advantages of the present invention will be apparent from a perusal of the following specification taken in connection with the accompanying drawings wherein:

Fig. 1 is a schematic view illustrating various uses of the novel single line compensator of this invention;

Fig. 2 is an enlarged, part-sectional view, with parts broken away, of the novel compensator or regulator illustrated in Fig. 1, showing the same in compensating position;

Fig. 3 is an enlarged view of a portion of the structure in Fig. 2, but illustrates the compensator or regulator in locked position during a control operation;

Fig. 4 is a sectional view taken along the line 4—4 of Fig. 3;

Fig. 5 is a view, similar to Fig. 2, of a modified regulator;

Fig. 6 is a sectional view taken along the line 6—6 of Fig. 5;

Fig. 7 is a sectional view taken along the line 7—7 of Fig. 5;

Fig. 8 is a sectional view taken along the line 8—8 of Fig. 5; and

Fig. 9 is a perspective exploded view of certain parts of the structure of Fig. 5.

Similar characters of reference are used in the above figures to designate corresponding parts.

Referring now to the drawings in detail, in Figs. 1 through 3 the novel single line compensator or regulator of this invention is designated as a whole by the reference numeral 1 and comprises a cylindrical casing 2 having an eye bolt 3 connected to one end thereof, as by being threaded into a cylindrical header or plug 4, secured within one end portion of the casing 2 as by rivets 5. The eye bolt 3 is adapted to be connected to a control member 6, such as a lever or foot pedal, as by connecting linkage or other force-translating means 7. Contained within the casing 2 is a movable piston 8 which is fixed upon the end of a compensating shaft 9 that extends within the casing 2 and projects outwardly thereof and through an aperture provided in a frame or stop member 10. Contained within the casing 2, in surrounding relation to the compensating shaft 9, there is a compression compensating spring 13 that is confined between the piston 8 and the annular flange 14 provided on a sleeve 15 that surrounds and is longitudinally slidable upon the shaft 9 within the casing 2. The sleeve 15 is adapted, owing to the pressure of spring 13, to press against a pair of canting or locking washers 16 mounted on the shaft 9 and through which this shaft is adapted to slide. As especially shown in Fig. 4, these washers are provided with outwardly projecting tongues 17 that project into a radial aperture 18 provided in the casing 2. Thus, as viewed in Fig. 3, the pressure of compensating spring 13 upon canting washers 16 tends to pivot these washers within the aperture 18, so that they tend to turn counterclockwise slightly and bind or lock upon the compensating shaft 9, thereby locking the casing 2 to the shaft 9, causing these members to move as a unit during a control movement of the single line compensator. Also, contained within the casing 2, adjacent the end nearest the frame or stop member 10, there is provided an annular ferrule or stop spacer member 19 which has a reduced annular portion 20 projecting freely through the open end of casing 2 and outwardly of this casing toward the frame or stop member 10. A nut 21 is shown threaded upon the outer end of the ferrule 19. The stop spacer member 19 is adapted to slide freely upon the shaft 9, and, when the line compensator is moved to the position shown in Fig. 2, with the member 19 abutting the stop member 10, this ferrule serves to turn the canting or locking washers 16 slightly clockwise into their unlocked position as shown in this figure, whereupon the shaft 9 is free to slide in either direction through the washers 16, as will be further explained.

The member 10 constitutes a fixed part of the vehicle or other structure within which the single line compensator operates. The outer free end of the compensating shaft 9 is adapted to be connected, as by a threaded eye bolt to the single line cable 11 which it is desired to keep taut at a desired rig load at all times, yet, at the same time, prevent any over-tautness of this cable. The cable 11 extends to the member to be controlled which always exerts a tension on the cable sufficient to compress spring 13 slightly. Thus, in Fig. 1a, the controlled member is illustrated as a pin 12 for controlling an explosive charge contained within a housing 33. In use, the shaft 12 is always urged towards the right as viewed in Fig. 1, so as to place a tension upon the cable 11 always somewhat in excess of the tension exerted on the cable by the compensating spring 13 when fully extended.

In Fig. 1b, the control member is illustrated as a shear pin 22 normally retaining two articulated latch segments 23 and 23' in abutting position. Upon a pull being exerted upon the control lever 6, the shear pin 22 will shear itself through the segment 23', allowing the segments to separate. In Fig. 1c, a dump door 24, normally held closed by detent latch 25, is adapted to be opened by a pull upon the control lever 6 acting through compensator 1 and cable 11. In Fig. 1d, a pull upon the control lever 6 connects through compensator 1 to actuate cable 11 to pull down brake lever 26 to actuate the piston of the master brake cylinder 27, as where it is desired to apply the brakes of a vehicle. In this case, the spring 28 is the brake hold-off spring and normally serves to hold the lever 26 against a stop 29, the spring 28 serving to compress compensator spring 13 a certain amount to cause compensating action, as will further appear.

In use, the pull exerted upon the cable 11 by the equipment to be actuated, such as that exerted by the hold-off spring 28 acting through cable 11, serves to compress compensator spring 13 somewhat to obtain the desired rig load, so that this spring is moved from its fully expanded position, shown in dot-dash position 8' of the piston 8, to the full-line position of this piston. The pressure thus exerted by compensator spring 13, acting through sleeve 15 and flange 14, serves to press the canting washers into abutting relation with the ferrule 19, thus pressing this ferrule against the stop 10. In this position of the ferrule 19, the washers 16 are positioned so as to extend substantially at right angles to the shaft 9, in which position the shaft 9 is free to slide through the washers 16 without these washers binding upon the shaft. Thus, with no pull exerted upon the control lever 6, the compensator spring 13 is free to expand and contract within the casing 2, thereby moving shaft 9 back and forth within the casing 2 so as to maintain a desired substantially constant rig load or tension upon the cable 11 at all times, so that this cable does not get slack or over-taut, which would otherwise occur in case the compensator were not used. Thus, the cable 11 might be quite long, and its temperature coefficient of expansion and contraction would not be the same necessarily as that of the vehicle in which it is used, so that, with changes in temperature, if the compensator 1 were not used the cable 11 at certain times would become over-taut tending to operate the controlled member or to move the control lever or pedal 6 to an undesired position, if this lever or pedal is free to move. On the other hand, where the cable 11 becomes slack through a rise in temperature, the control becomes sloppy, so that a desired movement of the control lever 6 would not produce the desired movement of the controlled member, such as the pin 12 or the pin 22, which would result in uncertain operation. Thus, it will be seen that, when the system is in a quiescent state, as temperatures raise and lower, the piston 8 moves within the casing 2 under the action of spring 13 to maintain the desired rig load upon the cable 11 at all times. This also takes care of such things as deflection of the vehicle structure, such as airframe deflection, or any means tending to cause a difference in the spacing of the control and controlled members.

However, as soon as a control movement is applied to the control lever 6 to actuate the controlled member, such as the pin 12 or the pin 22, the movement of the lever in a clockwise direction as shown in Fig. 1 will exert a pull upon eye bolt 3, which pull is exerted through casing 2 and the wall of slot 18, initially turning the canting washers 16 counter-clockwise with respect to shaft 9, thereby locking these canting washers 16 upon the shaft. Further movement of the casing 2 towards the left as viewed in Figs. 2 and 3 will cause the gripping action of the canting washers 16 upon the shaft 9, to effect movement of shaft 9 along with casing 2 towards the left as viewed in these figures. The movement of shaft 9 towards the left also serves to move cable 11 towards the left and effect the desired operation of the controlled member, such as the shearing of the pin 12' in Fig. 1a and the explosion of the charge within the housing 33, or the shearing of pin 22 in Fig. 1b and the separation of members 23 and 23', the opening of the door 24 in Fig. 1c, or the application of the brakes in the case of Fig. 1d. As soon as the lever 6 is released by turning the same counter-clockwise to its initial off position, the compensator 1 is returned to its initial position with the ferrule 19 abutting the fixed stop 10 as shown in Fig. 2, in which position the canting washers are moved slightly clockwise to their unlocked position, again permitting compensating action of the spring 13.

A somewhat modified form of the invention is shown in Fig. 5 wherein the control pedal or lever is adapted to be connected to a cable 30, which cable has a ball connector 31 at its end retained within the header 32 of casing 35 of compensator 1'. This compensator comprises a cylindrical pedestal housing 34 that is provided with a flange 36 adapted to be attached to a fixed part of the vehicle 10. The casing 35 is slidable within the housing 34 and has a nut member 37 (see also Fig. 9) threaded upon its inner end, which nut member is provided with an extension 38 carrying a pivot pin 39 upon which is pivoted a locking or canting washer 40 mounted upon a compensating shaft 41 which is slidable through the washer 40 when the washer 40 is not canted, as illustrated in Fig. 5. The compensating shaft 41 extends within casing 35 and has an enlarged piston-like head 42 contacting and sliding within the inner bore of the casing 35. A compensating spring 44 is confined between the piston 42 and a sleeve member 45 that is slidable upon the compensating shaft 41. The sleeve member 45 has a reduced portion slidable within the nut member 37 and an enlarged eccentric portion 46 that carries a pressure pin 47.

The controlled member is connected to a line cable 48 and exerts tension on this cable. The line cable 48 is connected through a ball connector 49' to the compensating shaft piston 42 and exerts compressive force upon the compensating spring 44. Thus, when the controlled member is not being actuated, the pressure of compensating spring 44, exerted through sleeve member 45 and pressure pin 47, serves to urge canting or locking washer 40 counterclockwise slightly, as viewed in Fig. 5, so that this washer abuts against a stop spacer member or washer 49 retained within the housing 34 by means of a snap ring 50, and this position of the canting washer 40, extending as it does transversely of the compensating shaft 41, permits the free movement of this shaft through the washer 40 in either direction, so that the spring 44 is free to maintain a constant rig load upon the line cable 48. As soon as a control movement is applied to the controling member such as a hand lever, the control cable 30 is moved to the right as viewed in Fig. 5. This movement of the control cable moves casing 35 to the right, so that the pin 39 moves the lower portion of canting washer 40 to the right, thereby turning this washer counterclockwise slightly with respect to compensating shaft 41 and effecting the locking or binding of this washer upon the shaft. During this action, the pressure of pin 47 upon the washer 40, due to spring 44, presses the upper portion of the washer 40 against the stop spacer member 49 and, with the bottom part of the washer moving away from this stop spacer or washer, an instant locking of casing 35 to shaft 41 is effected. Thus, movement of the control cable 30 acts automatically to lock the casing 35 to the compensating shaft 41, so that the line cable 48 is forced to move to the right also and effect the desired operation of the controlled member.

When the control member is returned to its initial inoperative position, the casing 35 is retracted within the casing 34, so that the lower part of the canting washer 40 again abuts the stop spacer member 49, permitting relative movement of shaft 41 and compensation of the cable 48 thereafter.

Thus it will be seen that the novel compensator of the present invention is of small, compact size and especially designed to control the tension in a single line cable system, the said compensator providing for positive, immediate response to any operating force and yet preventing slack or over-tautness in the cable system by maintaining automatically a constant rig load when the system is not under an operating force, the rig load depending upon the tension of spring 13 or 44.

Since many changes could be made in the above construction of the single line regulator and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A single line compensator comprising a casing, a compensating spring within said casing, a compensating shaft within said spring and having means thereon abutted by one end of said spring, means connecting said compensating shaft to a controlled cable, means for applying the pressure of the other end of said spring to a canting washer mounted on said compensating shaft, said canting washer normally being slidable upon said compensating shaft during compensating action of said compensator permitting expansion and contraction of the controlled cable through flexure of said compensating spring, said casing being connected to a control member and having means for effecting the turning of said canting washer and the locking of the same upon said compensating shaft upon the actuation of the control member, thereby to effect actuation of the controlled cable.

2. A single line compensator as defined in claim 1 wherein the means for effecting the turning of said canting washer comprises a slot in the wall of said casing, said washer having a tongue for engaging in said slot to be actuated by the latter.

3. A single line compensator as defined in claim 1 wherein the means for effecting the turning of said canting washer comprises a pivotal pin supported from said casing upon which said canting washer is pivoted.

4. A single line compensator as defined in claim 1 comprising a stop spacer member surrounding said compensating shaft and interposed between said canting washer and a fixed support for engaging said canting washer and the support to turn said washer and effect the release of the same from said compensating shaft at the conclusion of a control movement, whereupon compensating action of said line compensator is restored.

5. A compensator for connecting in a single line cable system interconnecting a control member and a controlled member, comprising a casing connected to the control member and a compensating shaft connected to the controlled member, a stop member interposed between said casing and a fixed support, a canting washer carried by said casing in surrounding relation to said compensating shaft, and a compensating spring surrounding said compensating shaft and interposed therebetween and said canting washer for effecting compensating movements of said compensating shaft to retain the cable system at the desired rig load, the said canting washer sliding over said compensating shaft during such compensating action and locking said canting washer upon said compensating shaft to effect simultaneous movement of said casing and shaft during control movements of the control member.

6. A compensator as defined in claim 5 wherein said stop member, by engaging the fixed support, serves to release the canting washer from said compensating shaft at the end of a control movement, thereby permitting compensating action of the compensator to recommence.

7. A compensator as defined in claim 5 wherein said casing is provided with a nut member having a pivotal pin upon which said canting washer is pivoted, and a sleeve member slidable upon said compensating shaft and engaged by said compensating spring, said sleeve member having means abutting said canting washer for pressing the same against said stop member.

References Cited in the file of this patent

UNITED STATES PATENTS

| | | |
|---|---|---|
| 179,973 | Thornton | July 18, 1876 |
| 567,355 | Palmer | Sept. 8, 1896 |
| 790,331 | Terry | May 23, 1905 |
| 923,965 | Gether | June 8, 1909 |
| 991,817 | Baldridge | May 9, 1911 |
| 2,363,228 | Cade | Nov. 21, 1944 |

FOREIGN PATENTS

| | | |
|---|---|---|
| 590,962 | Great Britain | Aug. 1, 1947 |

OTHER REFERENCES

"Flight," pages 424, 425, Oct. 17, 1946.